(12) United States Patent
Ojala et al.

(10) Patent No.: US 11,660,912 B2
(45) Date of Patent: May 30, 2023

(54) TIRE WITH A WIRELESS INDICATOR

(71) Applicant: Nokian Renkaat Oyj, Nokia (FI)

(72) Inventors: Jari Ojala, Nokia (FI); Jani Räisänen, Pirkkala (FI); Teemu Soini, Tampere (FI); Pekka Iso-Ketola, Sastamala (FI); Simo Vapaakoski, Tampere (FI); Tero Taipale, Tampere (FI)

(73) Assignee: NOKIAN RENKAAT OYJ, Nokia (FI)

( * ) Notice: Subject to any disclaimer, the term of this patent is extended or adjusted under 35 U.S.C. 154(b) by 471 days.

(21) Appl. No.: 16/622,972

(22) PCT Filed: Jun. 27, 2018

(86) PCT No.: PCT/FI2018/050502
§ 371 (c)(1),
(2) Date: Dec. 16, 2019

(87) PCT Pub. No.: WO2019/008228
PCT Pub. Date: Jan. 10, 2019

(65) Prior Publication Data
US 2020/0101797 A1    Apr. 2, 2020

(30) Foreign Application Priority Data
Jul. 3, 2017  (EP) ..................... 17397517

(51) Int. Cl.
*B60C 11/24*    (2006.01)
(52) U.S. Cl.
CPC .......... *B60C 11/243* (2013.01); *B60C 11/246* (2013.01)

(58) Field of Classification Search
CPC ...... B60C 11/24; B60C 11/243; B60C 11/246
See application file for complete search history.

(56) References Cited

U.S. PATENT DOCUMENTS

| 2005/0007239 A1 | 1/2005 | Woodard et al. |
| 2005/0061069 A1 | 3/2005 | Robert |

(Continued)

FOREIGN PATENT DOCUMENTS

| CN | 1396067 A | 2/2003 |
| CN | 203198637 U | 9/2013 |

(Continued)

*Primary Examiner* — Cedrick S Williams
(74) *Attorney, Agent, or Firm* — Merchant & Gould P.C.

(57) ABSTRACT

A tire configured to rotate about an axis of rotation, the tire comprising a tread block forming at least a part of a tread of the tire and a circuit comprising a primary capacitive component, wherein at least a part of the primary capacitive component is arranged a first distance apart from the tread and inside the tread block and a primary inductive component of which at least a part is arranged a second distance towards the interior of the tire from the tread. The tire further comprises an interrogator comprising an electric source, a communication circuit, and a secondary inductive component. The secondary inductive component is arranged on the same side of the tread as the primary inductive component and at least a part of the secondary inductive component is arranged a third distance apart from the tread, the third distance being greater than the second distance. A method for arranging a wear indicator to a tire.

11 Claims, 8 Drawing Sheets

(56) References Cited

U.S. PATENT DOCUMENTS

2016/0031272 A1* 2/2016 Peine .................... B60C 11/243
  340/442
2016/0161243 A1* 6/2016 Ledoux ................ G01M 17/02
  73/146

FOREIGN PATENT DOCUMENTS

| CN | 104228476 | A |  | 12/2014 | |
|----|-----------|---|--|---------|--|
| DE | 19745734 | A1 | * | 4/1999 | ............. B60C 11/24 |
| DE | 19954814 | A1 |  | 5/2001 | |
| EP | 1798071 | A2 |  | 6/2007 | |
| EP | 2368724 | A1 |  | 9/2011 | |
| EP | 3599113 | A1 | * | 1/2020 | ........... B60C 11/243 |
| JP | 2010143293 | A |  | 7/2010 | |
| WO | WO-2015083072 | A1 | * | 6/2015 | ........... B60C 11/243 |

* cited by examiner

TIRE WITH A WIRELESS INDICATOR

PRIORITY

This application is a U.S. national application of the international application no. PCT/FI2018/050502 filed on Jun. 27, 2018, which claims priority of European application EP17397517.8 filed on Jul. 3, 2017, the contents of all of which are incorporated herein by reference.

TECHNICAL FIELD

The invention relates to tires with electrical wear indicators. The invention relates to tires with wear indicators based on an LC or LCR resonator of which inductance and/or oscillation frequency in configured to change as a surface of the tire wears.

BACKGROUND

Remote monitoring systems employing LCR (inductance—capacitance —resistance) circuits are known e.g. from a document US 2005/0007239. In connection with an interrogation means, such circuits enable monitoring of a variety of properties, including strain, temperature, pressure, identification, performance, chemical phase transition (such as melting and state-of-cure), fluid level, wear, rotation rate, location and proximity. In general, the LCR circuit is passive, e.g. free from an electric source that converts chemical energy into electricity, even if the inductance itself is used to produce electricity by a varying magnetic field. However, the interrogation means is active, including an electric source that converts chemical energy into electricity. Typically the interrogation means is a hand held device or a device fixed to a system. The position of the interrogation means relative to the circuit can be reasonably freely chosen. However, the power consumption of the interrogation means depends on the reading distance.

SUMMARY

It has been found, that such remote monitoring systems are particularly feasible, when the measured surface, such as a wearing surface of a tire, needs to be leak-proof, either for water and/or other liquids or air and/or other gases. The issues is even more important if the liquid or gas is pressurized. In such a case, wiring from a measuring circuit would easily pose leakage problems. However, such issues are not present in wireless remote monitoring systems.

There are some problems when the system having the interrogator and the circuit is used to measure at least a property of a surface, e.g. wear of the tread of a tire. For example, the coil in such measurements is embedded in a piece of material that wears, e.g. a tread block of a tire. This affects the sensitivity of the measurements. It has been noticed that the sensitivity can be improved by applying the interrogation device to a suitable position. The interrogator is applied to suitable position with respect the circuit and the device, i.e. the tire, from which the property, such as wear, is measured. In some applications, the device, i.e. tire, naturally comprises some metal in between the circuit and the interrogator. In such systems, the wireless communication in between is deteriorated by the structure of the device. In particular in such cases, the mutual position between the circuit and the interrogator becomes important. In this description, the device is a tire having an electrical wear indicator. The tire may be a pneumatic tire. A tire or a pneumatic tire typically comprises a metallic reinforcing belt, e.g. a steel belt. The metallic belt may hinder the RF communication between the interrogator and the circuit.

DETAILED DESCRIPTION

Figure 1A:
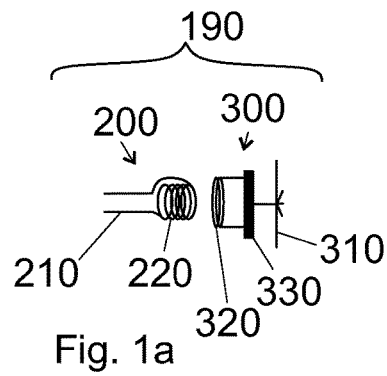
FIG. 1a shows, as a side view, a wear indicator 190.

Hereinafter, the embodiments are explained in connection with a wear indicator. However, in this description, a wear indicator serves for the purpose of an example of a more general device 100, in particular a tire 100, such as a pneumatic tire, having an embedded circuit 200 and in interrogator 300. FIG. 1a shows in a principal view a wear indicator 190. The wear indicator comprises a circuit 200 and an interrogator 300. The interrogator 300 is configured to interact with the circuit 200 wirelessly, as detailed below. This helps the leakage problems indicated above.

The wear indicator 190 is arranged in a tire 100 in such a way that a capacitive component thereof wears, as the tread 120 of the tire wears. The tire may be a pneumatic tire. However, the tire may be a non-pneumatic tire. Typically both pneumatic and non-pneumatic tires limit a cavity (e.g. a single cavity for pressurized air) or cavities (cavities within a non-pneumatic tire). The tire may be a tire for a passenger vehicle, such as a passenger car tire. The tire may be a heavy tire, i.e. a tire for a heavy machine, such as a forwarder, a loader, a truck, a caterpillar. The tire may be a tire for a motorcycle.

The circuit 200 comprises a primary capacitive component 210 and a primary inductive component 220. The primary capacitive component 210 is electrically connected to the primary inductive component so as to form an electric oscillator. The circuit 200 may further comprise a resistive component (not shown). The oscillator is thus an LC or an LRC oscillator. The circuit 200 is energetically passive, i.e. it is free from a battery configured to convert chemical energy to electricity. The primary inductive component 220 transforms magnetic energy to electricity, which becomes temporarily stored in the primary capacitive component 210, as per se known from an LC or an LCR oscillator. The oscillation frequency and/or the inductance of the circuit 200 is/are dependent on the capacitance of the primary capacitive component 210 and the inductance of the primary inductive component 220. Typically, the angular resonant frequency of the circuit is expressed as $\omega = 1/\sqrt{(L1 \times c1)}$, wherein L1 is the inductance of the primary inductive component 220 and c1 is the capacitance of the primary capacitive component 210. As will be detailed below, in an embodiment, the primary capacitive component 210 is configured to wear in use, whereby its capacitance c1 changes. This affects e.g. the angular resonant frequency $\omega$. This affects also the mutual inductance, in particular at a certain frequency, of the primary inductive component 220 and a secondary inductive component 320. In this way, e.g. these quantities are indicative of how much the primary inductive component 220 has worn. However, also other quantities may affect the capacitance c1 of the primary capacitive component 210. Thus, e.g. the aforementioned quantities may be indicative of also other parameters of the primary capacitive component 210 or the environment nearby the primary capacitive component 210, such as moisture near the primary capacitive component 210 and/or moisture e.g. in between two electrodes (212, 214) of the primary capacitive component 210.

The primary capacitive component 210 need not wear during measurements. It is possibly, for example, to measure the humidity of the environment, wherein the circuit is embedded. As known, the humidity affects the dielectric constant of a capacitor, and thus also the angular resonant frequency $\omega$ of the LC circuit. In addition or alternatively, the inductance of the primary inductive component 220 may be affected by the environment and/or use of the device 100. For example, if the body 110 of the device 100 comprises magnetic material, the inductance of the primary inductive component 220 may change as the material of the body 110 wears. In addition or alternatively, the circuit 240 may comprise a primary sensor arrangement 240 for measuring some quantities.

The interrogator 300 comprises an electric source 330, a communication circuit 310, and a secondary inductive component 320. The electric source is needed to power the interrogator. The electric source may be e.g. configured to transform mechanical and/or chemical energy to electric energy. As an alternative or in addition, the electric source may comprise a component configured convert magnetic energy into electricity. As an alternative or in addition, the electric source may comprise high-capacitance capacitor (e.g. a super capacitor) storing electric energy as such. Such a high-capacitance capacitor can be charged e.g. inductively or mechanically with a component transforming magnetic or mechanical energy, respectively, to electricity. A high-capacitance capacitor herein refers to a capacitor having a DC capacitance of at least 1 µF.

The secondary inductive component 320 is used to interrogate the circuit 200. Thus, by forming a magnetic field to the secondary inductive component 320, the magnetic field also penetrates the primary inductive component 220 thus affecting the mutual inductance of the interrogator 300 and the circuit 200. In this way, the mutual inductance and/or the angular resonant frequency (or the resonant frequency) of the circuit can be measured.

Figure 7:
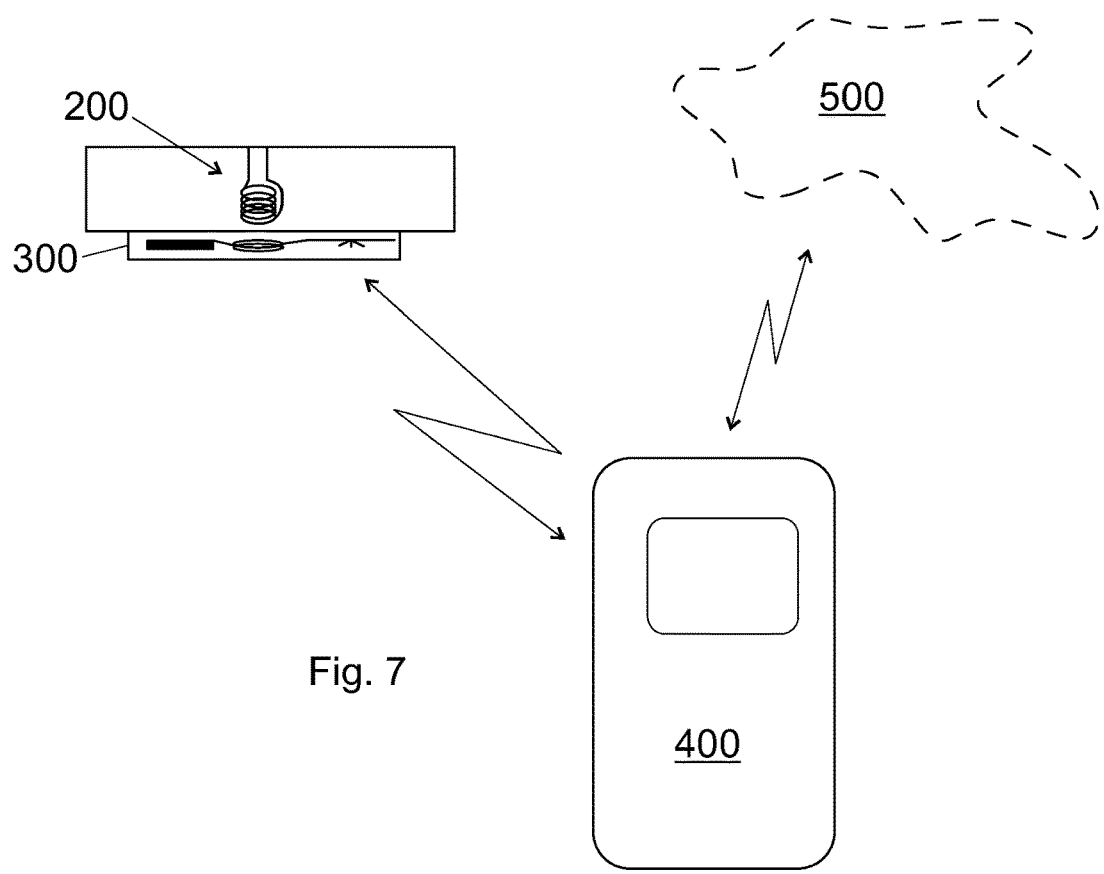
FIG. 7 illustrates a system including a wear indicator, a gateway device 400, and a cloud server 500.

The communication circuit 310 may be used to communicate the measured data to a gateway device 400 (see FIG. 7). The communication circuit may comprise a control circuit for measuring the mutual inductance and/or the resonant frequency of the circuit. In the alternative, the interrogator 300 may comprise a separate control circuit for the purpose. In an embodiment, the interrogator 300 is configured to measure at least one of [i] a mutual inductance of the secondary capacitive component 320 and the circuit 200, [ii] an inductance of the circuit 200, and [iii] a resonance frequency of oscillation of the circuit 200.

Figure 1B:
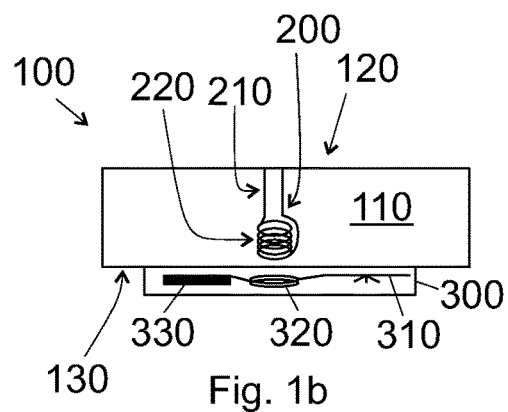
FIGS. 1b and 1c show, as a side view, a device 100 having a wear indicator 190 for measuring wear of a surface 120 of the device 100.
Figure 1C:
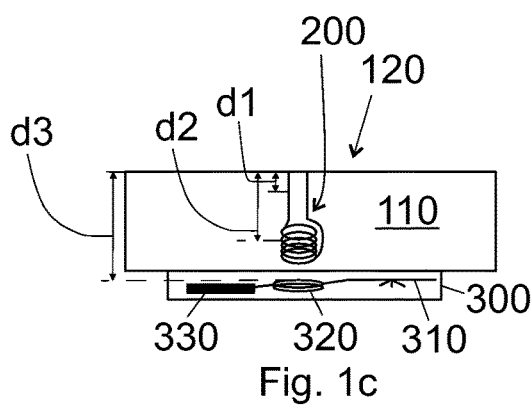

Referring to FIG. 1b, such a wear indicator 190 can be used to measure wear of a first surface 120 of a body 110, in particular wear of tire tread 120, of which a part is formed by a tread block 110. The first surface 120 is the surface that wears in use. When using such a wear indicator 190, the circuit 200 is applied to a wearing surface 120, e.g. a tread of a tire, in such a way that the primary capacitive component 210 also wears as the wearing surface 120 wears. The capacitor needs not to reach the surface of an unworn wearing surface, since it may suffice to measure the wear of only such surfaces that have worn a reasonable amount. However, preferably, only the primary capacitive component 210 wears, but not the primary inductive component 220. Therefore and with reference to FIG. 1c, in an embodiment, the circuit 200 is arranged in the body 110 in such a way that the primary capacitive component 210 configured to wear as the first surface 120 of the body 100 wears. Moreover, at least a part of the primary capacitive component 210 is arranged a first distance d1 apart from the first surface the body and inside the body 110. Furthermore, at least a part of the primary inductive component 220 is arranged a second distance d2 apart from the first surface 120 of the body 110 and inside the body 110. In a wear indicator, the second distance d2 is preferably greater than the first distance d1. In this way, as the first surface 120 wears, the primary capacitive component 210 starts to wear before the primary inductive component 220 starts to wear. Preferably the wear indicator 190 is arranged in such a way that, in normal use, the primary inductive component 220 does not wear. Moreover, as indicated above, in some other embodiments the second distance d2 may be less than the first distance d1, because neither of the primary capacitive and inductive components need to wear.

Moreover, the interrogator 300 is arranged, relative to the circuit 200, in such a way that the secondary inductive component 320 is arranged on the same side of the first surface 120 as the primary inductive component 220. The secondary inductive component 320 may be arranged inside the body 110 or on another side of the body 110. Moreover, at least a part of the secondary inductive component 320 is arranged a third distance d3 apart from the first surface 120 the body, the third distance d3 being greater than the second distance d2. This has the effect that also the secondary inductive component 320 does not start to wear until the primary inductive component 220 starts to wear (if it is to wear). This has the further effect that such a placement improves the magnetic coupling between the primary inductive component 220 and the secondary inductive component 320.

Figure 9A:
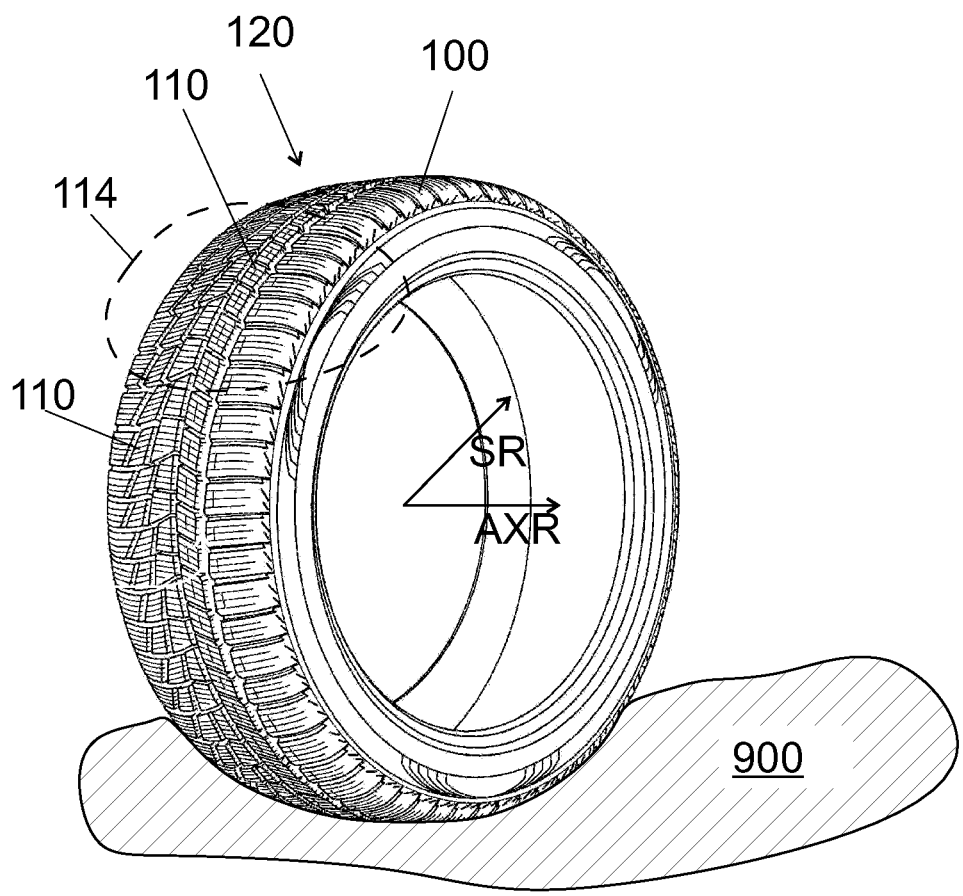
FIGS. 9a and 9b show a pneumatic tire 100 having the wear indicator.
Figure 9B:
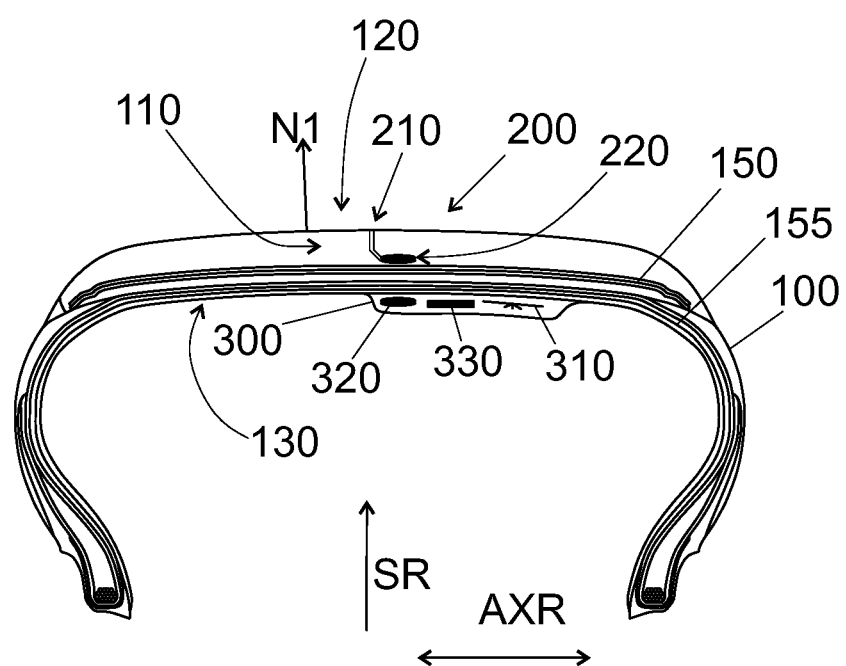

Herein the body 110, in combination with the wear indicator 190, forms a tire 100 according various embodiments. Referring to FIGS. 9a and 9b, in some embodiments, the body 110 is a body part of a pneumatic tire, whereby the device 100 is a pneumatic tire having an integrated electrical wear indicator. The body 110 may be e.g. a tread block of a tire 100.

Figure 1D:
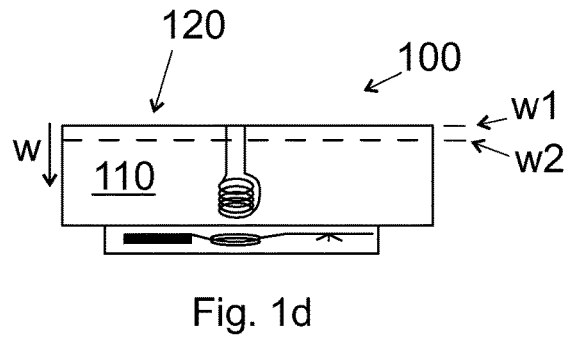
FIG. 1d shows wear (w, w1, w2) of the wear indicator of FIG. 1a, FIG. 1e shows a worn wear indicator of FIG. 1c, wherein the indicator has worn by the wear (w, w1, w2) of the surface 120.

Referring to FIG. 1d, in general, the amount of wear is referred to with a symbol w. FIG. 1d indicates two values of wear, w1 and w2. In FIG. 1d, the value of wear w1 refers to the value of wear w1 of the surface 120 of FIG. 1d. The surface 120 may be e.g. unworn, and the value of wear w1 may be e.g. zero.

Figure 1E:
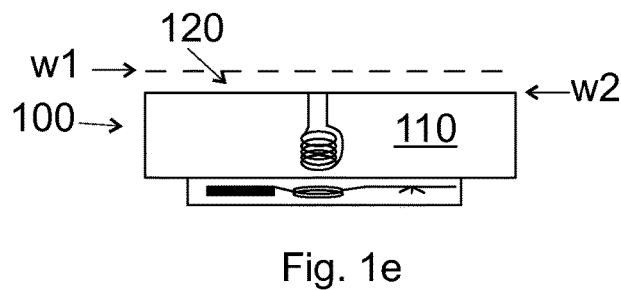
FIG. 1f shows, as a side view, a wear indicator 190 having two ferrite plates.
FIG. 1g shows, as a side view, a wear indicator, of which capacitive component comprises multiple capacitors.

FIG. 1e shows the device 100 of FIG. 1d, after the surface 120 has worn some amount. The value of wear of FIG. 1e corresponds to w2. Thus, the surface 120 has worn by an amount of w2−w1 in between the FIGS. 1d and 1e.

Referring to FIG. 1b, in an embodiment, the interrogator 300 is arranged on a second surface 130 of the object 110, wherein the second surface 130 is opposite to the first surface 120. The second surface may be a surface of a cavity limited by a tire 100. For example, the second surface 130 may be a surface of an interior of a pneumatic tire 100.

Since the primary capacitive component 210 is configured to wear by the same amount as the wearing surface 120, preferably, the primary capacitive component 210 resists wear at most to the same degree as the body 110. In other words, preferably, the material of the primary capacitive component 210 resists wear at most to the same degree as the material of body 110. This ensures that the primary capacitive component 210 wears, in use, by the same amount as the wearing surface 120; at least when the surface 120 has worn to the limit where the primary capacitive component 210 starts to wear (see FIG. 2a).

FIGS. 2a to 2e indicate some embodiments of the device 100. In these figures the primary capacitive component 210 comprises a first electrode 212 and a second electrode 214.

Figure 2A:
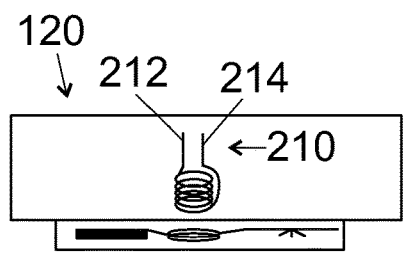
FIGS. 2a to 2e show embodiments of wear indicators and corresponding devices.

As seen in FIG. 2a, in an embodiment, when the first surface 120 is unworn, the primary capacitive component 210 is arranged a distance apart from the first surface 120. In this way, the wear indicator is configured not to measure small values of wear, but only values greater than a limit. Such a limit is defined by the distance between the primary capacitive component 210 and the surface 120.

Figure 1F:
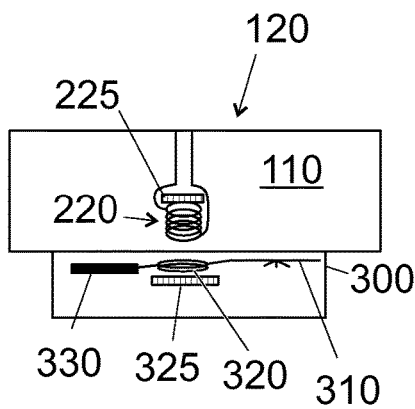
Figure 1G:
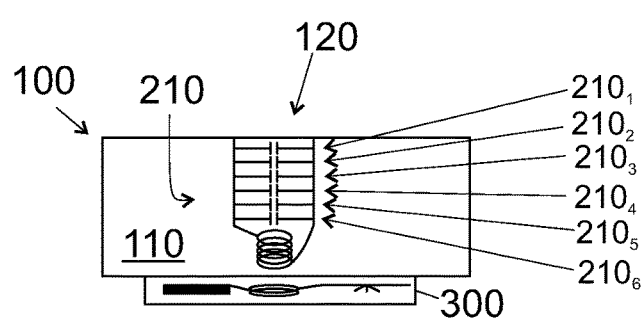
Figure 2B:
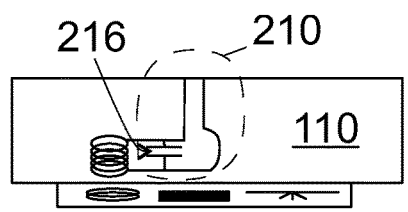

In the embodiment of FIG. 2b, the primary capacitive component 210 comprises a base capacitor 216. The base capacitor 216 is configured not to wear in use. This has the effect that the capacitance of the primary capacitive component 210 remains sufficiently high throughout the design life of the wear indicator. The base capacitor 216 may comprise a part of the electrodes (212, 214; see FIGS. 6b and 6d). In addition or alternatively, the base capacitor 216 may comprise separate electrodes (see FIG. 6f). In addition or alternatively, the base capacitor 216 may comprise a separate capacitive component (see FIG. 6g). The separate capacitive component may be used also, when the primary capacitive component 210 comprises discrete capacitors $210_1$, $210_2$, $210_3$, $210_4$, $210_5$, and $210_6$, as indicated in FIG. 1g.

The purpose of such a base capacitor 216 is to tune the capacitance c1 and thus also the angular resonant frequency ω of the circuit 200. This may improve the sensitivity of the circuit 200. In particular, this may improve the sensitivity of the pair of the circuit 200 and the interrogator 300, since the measurement electronics of the interrogator 300 may be designed to operate most efficiently on a defined frequency range. However, if the interrogator is designed differently, this issues noes not necessitate a use of a base capacitor 216.

In an embodiment the base capacitor 216 (or $210_6$) forms at least 25% of the capacitance c1 of the primary capacitive component 210. For example, the base capacitor 216 may be arranged deeper in the body 110 (i.e. further away from the surface 120) than a wearing part of the primary capacitive component 210. For example, the base capacitor 216 may be arranged e.g. on the other side 130 of the body 110 than the wearing part of the primary capacitive component 210.

When the primary capacitive component 210 comprises multiple capacitors $210_1$, $210_2$, $210_3$, $210_4$, $210_5$, and $210_6$, as indicated in FIG. 1g, the component $210_6$ placed furthest away from the surface 120 may serve as the base capacitor 216 not designed to wear in use. However, in an embodiment according to FIG. 1g, also the capacitors $210_6$ may be designed to wear in use.

Figure 2C:
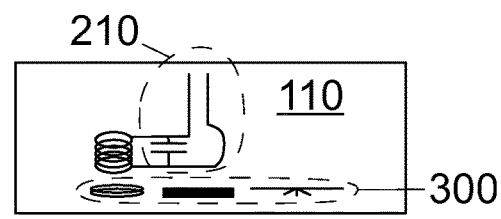
Figure 2D:
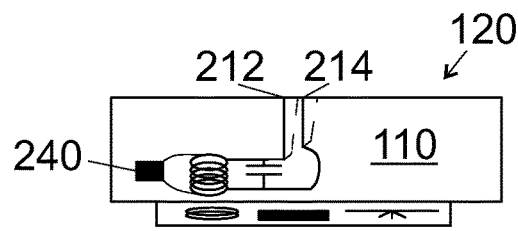
Figure 2E:
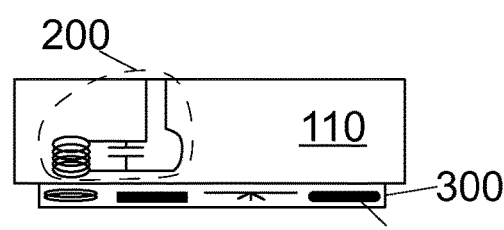

In the embodiment of FIG. 2c, the components of the interrogator 300 are arranged within the body 110. In the embodiment of FIG. 2d, the first 212 and second 214 electrodes are wider at the wearing surface 120 than deeper inside the body. Such electrodes are shown in more detail e.g. in FIGS. 6c and 6d. In the embodiment of FIG. 2e, the interrogator 300 comprises, in addition to the secondary inductive component 320, a secondary sensor arrangement 340. Such a secondary sensor arrangement 340 may comprise sensor or sensors configured to measure the environment in which the interrogator 300 is. The secondary sensor arrangement 340 may comprise e.g. at least one of a temperature sensor, a pressure sensor, and an acceleration sensor.

Referring to FIG. 2d, also the circuit 200 may comprise a primary sensor arrangement 240. The primary sensor arrangement may comprise a sensor or sensors that require only a little electricity for functioning. The primary sensor arrangement may comprise e.g. at least one of a pressure sensor, a humidity sensor, and a temperature sensor.

It has been observed, that as the primary capacitive component 210 wears, the effects of capacitance changes for small values of wear may be hard to detect. The inventors assume that this is a results of the proportional capacitance change (change in proportion to the capacitance of the components 210) may initially be smaller than later, since later on the value of the capacitance is also smaller. This issue may be corrected to some extent with the base capacitor, as discussed above. However, preferably this issue is also corrected by careful design of the primary capacitive component 210. Without going to details of the structure of the component at this point, FIG. 3 shows capacitance values c1 as function of wear w for four different primary capacitive components 210.

Figure 3:
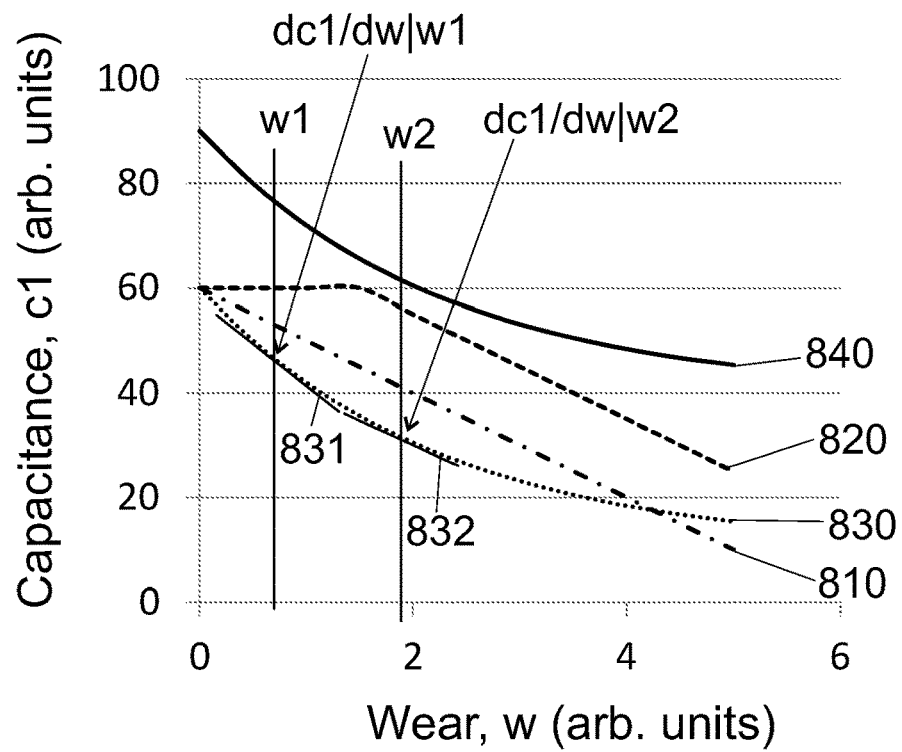
FIG. 3 shows a capacitance c1 of a primary capacitive component 210 as function of wear w for some embodiments, FIG. 4a indicates directions of magnetic fields generated and/or received by a primary inductive component 220 and a secondary inductive component 320, FIGS. 4b and 4c indicate magnetic fields generated and/or received by a primary inductive component 220 and a secondary inductive component 320, when at least a reinforcing structure 150, 155 is arranged in the body 110, FIGS. 5a and 5b indicate positioning of a primary inductive component 220 relative to a secondary inductive component 320.

As shown by the curve 810 in FIG. 3, in an embodiment, the capacitance c1 of the primary capacitive component 210 may decrease with a constant slope for all values w of wear. Such a curve may be the result of the electrodes having the form of parallel plates (FIG. 6a) or co-centric electrodes (FIG. 6e) with or without a base capacitor 216 (see also FIGS. 6b and 6f). A corresponding effect can be achieved also by using separate capacitors $210_1$, $210_2$, $210_3$, $210_4$, and $210_5$, (the capacitor $210_6$ being the base capacitor) as indicated in FIG. 1g the capacitors being equally spaced and equally large in terms of capacitance. However, since the capacitance c1 decreases also for small values of wear, the primary capacitive component is arranged to reach the wearing surface 120, as in FIGS. 1b, 1g, 2b, 2d, and 2e.

As shown by the curve 820 in FIG. 3, in an embodiment, the capacitance c1 of the primary capacitive component 210 may decrease with a constant slope only for reasonably large values w of wear. Since the capacitance c1 does not decrease initially, the primary capacitive component is arranged a distance apart from the wearing surface 120, as in FIGS. 2a and 2c. Since the slope is constant thereafter, such a curve may be the result of the electrodes having the form of parallel plates (FIG. 6a) or co-centric electrodes (FIG. 6e) with or without a base capacitor 216 (see also FIGS. 6b and 6f).

As shown by the curve 830 in FIG. 3, in an embodiment, the capacitance c1 of the primary capacitive component 210 may decrease in such a way that the capacitance c1 changes as function of wear more rapidly initially than later. Formally, the capacitance c1 of the primary capacitive component 210 is a function of wear c1=c1 (w). Moreover, the rate of capacitance change is the derivative dc1/dw of the capacitance c1 with respect to the wear w. For some value w1 of wear, the derivative dc1/dw at this point is herein and commonly denoted by dc1/w|w1. As well known, the derivative is the slope of the tangent line at that point. The corresponding tangent line for the for the curve 830 depicted in the figure by the line 831. For another value w2 of wear, the derivative dc1/dw at this point is herein and commonly denoted by dc1/w|w2. The corresponding tangent line for the for the curve 830 depicted in the figure by the line 832. As indicated in the figures, the derivative is negative since the capacitance decreases as the surface wears.

As shown by the curve 830 in FIG. 3, in an embodiment, the absolute value of the derivate for small values of wear w is larger than for large values of wear w. Formally ||dc1/w|w1||>||dc1/w|w2|| when w2>w1. Herein ||dc1/w|w1|| denotes the absolute value of dc1/w|w1 and ||dc1/w|w2|| denotes the absolute value of dc1/w|w2. As known, the capacitance is proportional to area of the electrodes and inversely proportional to the distance between the electrodes. Thus, the curve 830 may be e.g. a result of the electrodes of FIG. 6c, wherein the wider top of the electrodes 212, 214 is configured to wear earlier than the narrower bottom of the electrodes 212, 214. Such a capacitance change may be achieved, in addition or alternatively, by arranging the top parts of the electrodes 212, 214 closer to each other than the bottom parts, as indicated in FIG. 6g. A corresponding effect can be achieved also by using separate capacitors $210_1$, $210_2$, $210_3$, $210_4$, and $210_5$, (the capacitor $210_6$ being the base capacitor) as indicated in FIG. 1g. In such a case, a capacitor $210_1$ close to the surface 120 may have a capacitance greater than a capacitor $210_2$ further away from the surface 120. Moreover the capacitance of the base capacitor $210_6$ may be higher than the capacitance of another capacitor $210_1$, $210_2$, $210_3$, $210_4$, and $210_5$.

As indicated above, it may be beneficial to have a reasonably large capacitance c1. This value may be designed e.g. in such a way, that the resonant frequency of the circuit remains at reasonable level throughout the service life of the circuit. As shown by the curve 840 in FIG. 3, the capacitance c1 may be increased (relative to the curve 830). Such an increase may be achieved by a base capacitor 216, e.g. the base capacitor of FIG. 6d, or the capacitor $210_6$ that is arranged deepest.

In an embodiment, the primary capacitive component 210 is configured such that for a first value of wear w1, the derivative of the capacitance c1 of the primary capacitive component 210 with respect to wear w has a first value of capacitance change dc1/dw|w1, and for a second value of wear w2, the derivative of the capacitance c1 of the primary capacitive component 210 with respect to wear w has a second value of capacitance change dc1/dw|w2. In an embodiment, the first value of capacitance change dc1/dw|w1 is different from the second value of capacitance change dc1/dw|w2. In a preferred embodiment, the first value of wear w1 is smaller than the second value of wear w2 and the first value of capacitance change dc1/dw|w1 is negative and smaller than the second value of capacitance change dc1/dw|w2. In practice, the derivatives can only be measured as a differential from two different measurements. The derivative dc1/w|w1 may be calculated as a differential measured from a range of 0.5 mm the range comprising the small value w1 of wear. The derivative dc1/w|w2 may be calculated as a differential measured from a range of 0.5 mm the range comprising the larger value w2 of wear.

FIGS. 6a to 6i show embodiments of the circuit 200. The figures show only the primary capacitive component 210 and the primary inductive component 220. The circuit 200 may further comprise resistive components. Moreover, the electrical wires in between the components have some resistance.

Figure 6A:
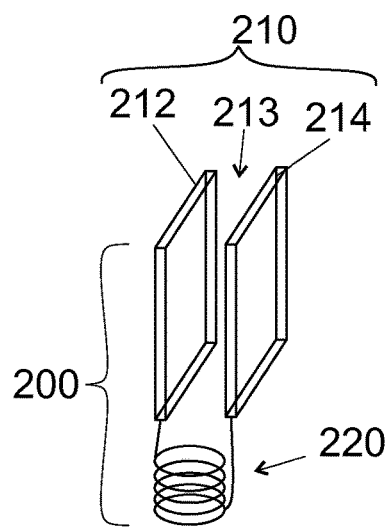
FIGS. 6a to 6i illustrate embodiments of a primary capacitive component 210.

In FIG. 6a, the primary capacitive component 210 is formed of a first plate forming a first electrode 212 and a parallel second plate forming a second electrode 214. In between the electrodes 212, 214 is arranged some material 213 that is not electrically conductive. The electrical resistivity of such material 213 may be e.g. at least 10 Ωm at 20° C. In order to have mechanical stability, preferably the material 213 is solid dielectric material. Preferably, the solid dielectric material 213 is solid in at least typical use conditions, such as at the temperatures from −55° C. to +150° C., such as from −55° C. to +100° C. The dielectric material 213 may be solid also at other temperatures, however, preferably it does not melt or vaporize at the aforementioned temperature ranges.

Figure 6B:
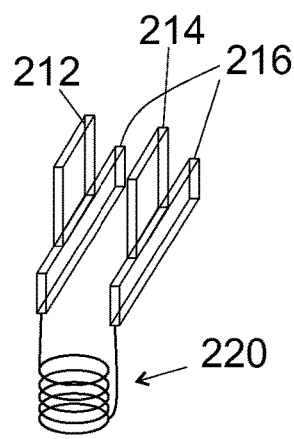
Figure 6C:
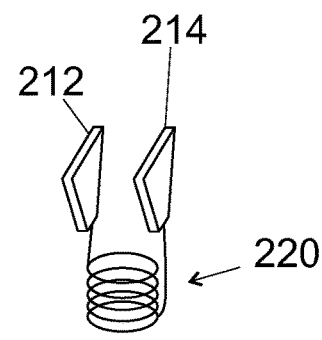
Figure 6D:
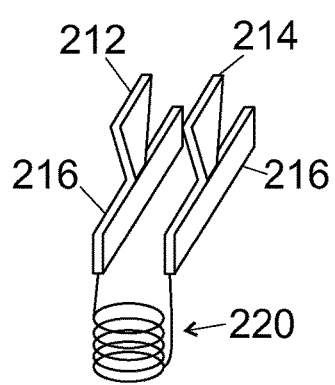

In FIG. 6b, a part of the electrodes 212, 214 form a base capacitor 216. In FIG. 6c, the capacitance change is designed to be initially larger than later on, as discussed in more detail above. In FIG. 6d, a base capacitor 216 has been added to the electrodes of FIG. 6c.

Figure 6E:
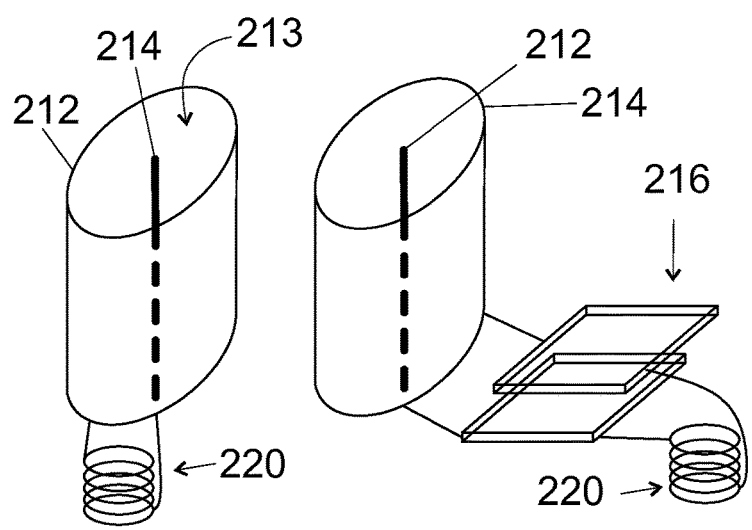
Figure 6F:
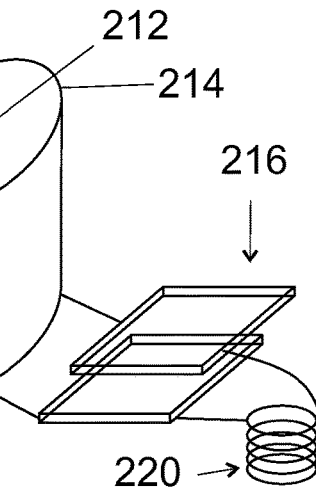
Figure 6G:
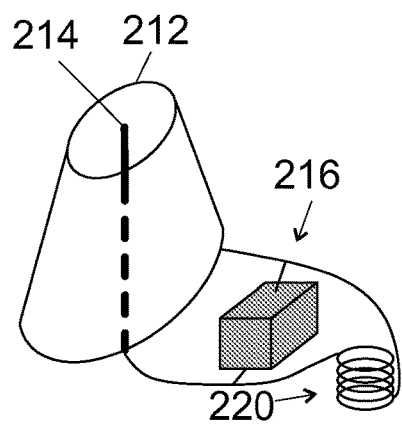

In FIG. 6e, the electrodes 212, 214 are arranged co-centrically. The outer electrode 212 has a shape of a generalized cylinder, such as an elliptic generalizer cylinder; preferably the outer electrode is a regular, i.e. circular, cylinder. The inner electrode 214 may be a bar or a cylinder. Preferably, some solid dielectric material 213 is arranged in between the inner electrode and the outer electrode. In FIG. 6f, a base capacitor 216 has been added to the electrodes of FIG. 6e. In FIG. 6g, the diameter of the outer electrode 212 is less near a wearing surface than further away from the wearing surface. This has the effect that the capacitance change is designed to be initially larger than later on, as discussed in more detail above. Moreover, the embodiment of FIG. 6g includes a base capacitor.

Figure 6H:
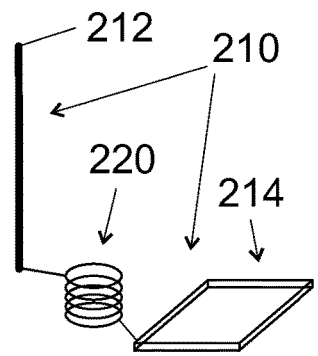
Figure 6I:
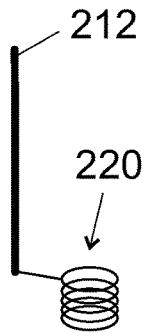

In FIG. 6h, the primary capacitive component 210 comprises a first electrode 212, which forms a capacitance with a ground electrode 214, i.e. a second electrode. However, as indicated in 6i, the circuit may function also without a ground electrode 214. In this embodiment, a capacitance is formed in between the first electrode 212 and the environment wherein is arranged. However, it has been noticed, that the measurements are more accurate, when the primary capacitive component 210 comprises the first electrode 212 and the second electrode 214. Measurements are accurate also when discrete capacitors are used (see FIG. 1g).

Referring to FIG. 1g, the primary capacitive component 210 need not to comprise plates. For example, a primary capacitive component 210 may comprise capacitors $210_1$, $210_2$, $210_3$, $210_4$, $210_5$, and $210_6$, which may be e.g. discrete components. When the tire wears, the components and/or their wiring also wear, whereby the capacitance of the primary capacitive component 210 changes. In such a case, the capacitors are arranged electrically in parallel so that each one of the capacitors increases the capacitance of the component 210.

Figure 8A:
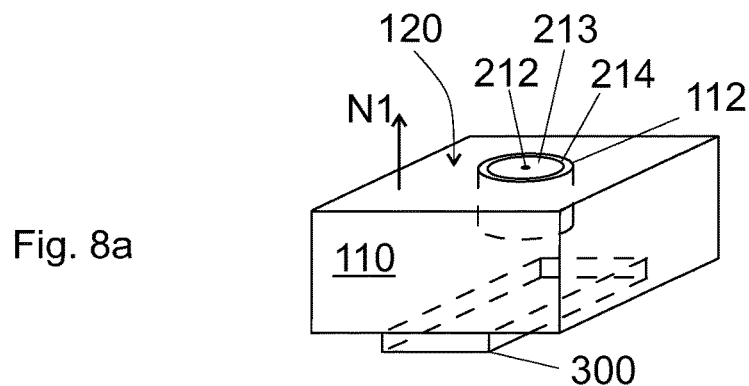
FIGS. 8a and 8b show a primary capacitive component 210 arranged in a blind hole 112 of a tire tread 120.
Figure 8B:
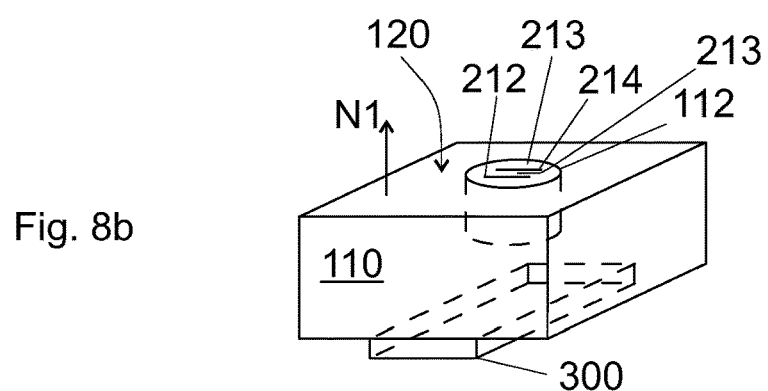

Referring e.g. to FIGS. 8a and 8b, in an embodiment, the body 110 comprises first material and limits a blind hole 112 for the circuit 200. In the embodiment, the circuit 200 is arranged in the blind hole 112. Moreover, the primary capacitive component 210 comprises (a,i) at least first electrode 212 or (a,ii) a capacitor $210_i$ (i=1,2,3,4,5,6), and (b) dielectric material 213 such that at least some of the dielectric material 213 is left in between (c) a part of the body 110 and (d,i) the first electrode 212 or (d,ii) the capacitor $210_i$ in a direction that is perpendicular to a normal N1 of the first surface 120. Moreover, it is noted that an electrode 212, 214 forms at least a part of a capacitor in general. Furthermore, preferably the dielectric material 213 is not the same material as the first material. Such an embodiment may have been manufactured e.g. by forming the blind hole 112 into the wearing surface 120, e.g. a tread 120 of a tire, and then inserting the circuit 200 into the blind hole 112. Such a method for manufacturing is typically much easier than e.g. arranging the circuit 200 into the body 110 e.g. during polymerization of the body 110. Moreover, forming a blind hole 112 to a cured or otherwise solid body 110 ensures that the circuit becomes arranged in a correct location and correct position. Such a blind hole can be formed e.g. during vulcanization of the tire, e.g. by using a tire mould. In the alternative, the blind hole can be manufactured, e.g. drilled, after vulcanization.

As indicated above and in FIGS. 8a and 8b, in an embodiment, the primary capacitive component 210 comprises a second electrode 214, and at least some of the dielectric material 213 is arranged in between the first electrode 212 and the second electrode 214. As indicated in FIGS. 8a and 8b, also some of the dielectric material 213 is left in between the body 110 and the first electrode 212 in a direction that is perpendicular to a normal N1 of the first surface 120.

In a preferred embodiment, the primary inductive component 220 and the second inductive component 320 component are arranged relative to each other in such a way that their magnetic fields are strongly coupled. Moreover, in a preferable embodiment, the body 110 is formed of solid material, and the primary inductive component 220 and the second inductive component 320 are rigidly fixed to the body 110. This has the effect that the mutual orientation and distance of the primary inductive component 220 and the second inductive component 320 remain constant in use, which significantly improves the sensitivity of the measurements and simplifies the analysis of the measured data.

Correspondingly, in an embodiment, the primary inductive component 220 is configured to form a primary magnetic field B1 and the secondary inductive component 320 is configured to form a secondary magnetic field B2. As known to a skilled person, the direction of such a magnetic field depends heavily on the point of observation. However, in the centre of the primary inductive component 220, the primary magnetic field B1 is directed to a primary direction dB1. This applies at least in the centre of a primary coil 222 comprised by the primary inductive component 220. Moreover, in the centre of the secondary inductive component 320, the secondary magnetic field B2 is directed to a secondary direction dB2. This applies at least in the centre of a secondary coil 322 comprised by the secondary inductive component 320. To have strong coupling between the magnetic fields B1 and B2, in and embodiment, e.g. in the embodiment of FIG. 4a, an angle α between the primary direction dB1 and the secondary direction dB2 is less than 30 degrees or more than 150 degrees, preferably less than 15 degrees or more than 165 degrees. Moreover, it is understood that the angle α between two directions is always at most 180 degrees by definition. At least, of the multiple angels that are theoretically definable, one is in the range from 0 to 180 degrees, and that angle is herein referred to.

Figure 4A:
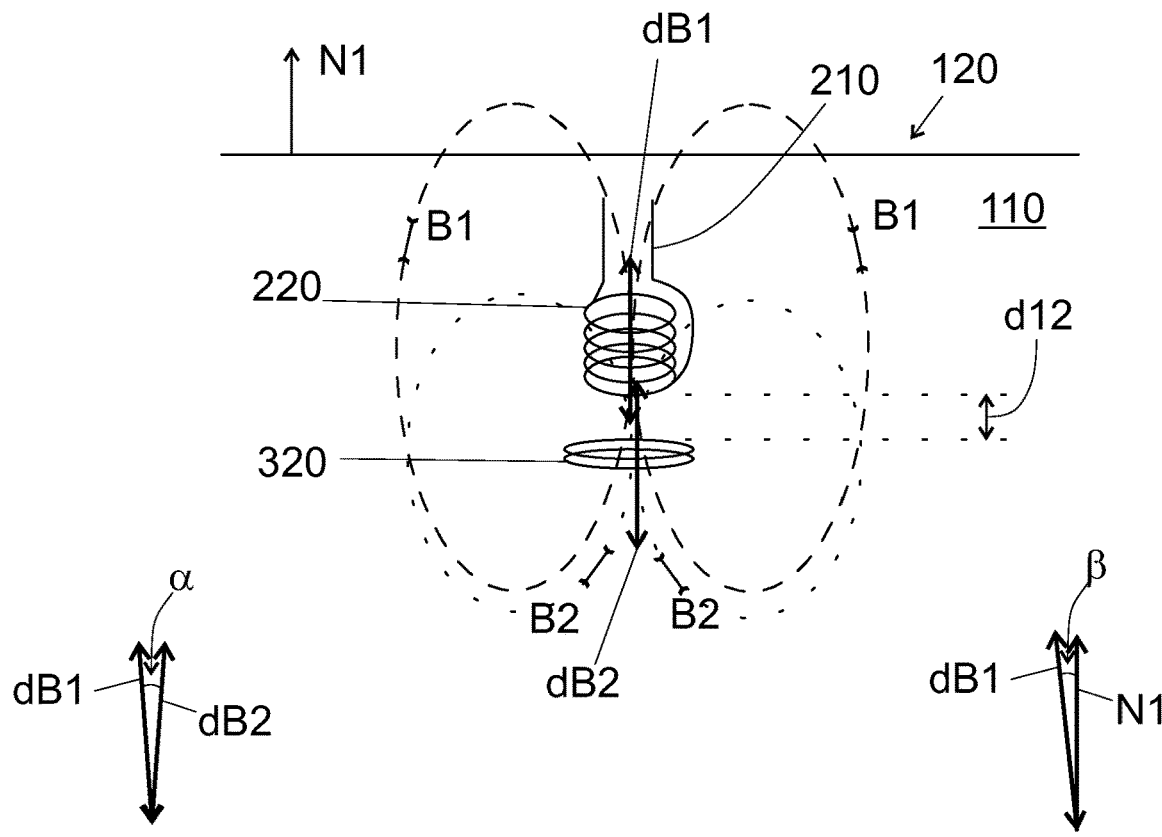
Figure 4B:
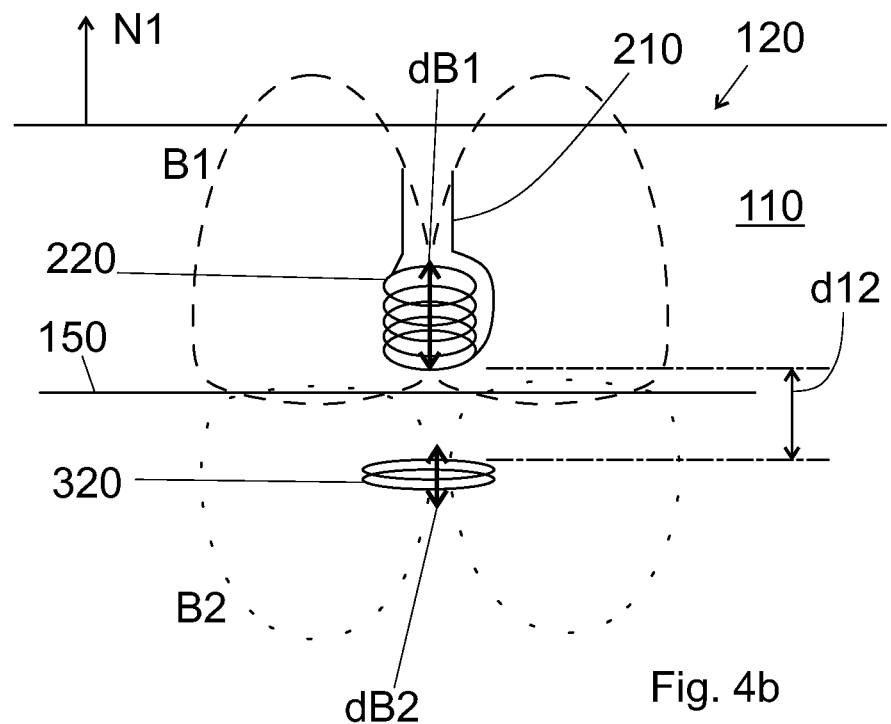
Figure 4C:
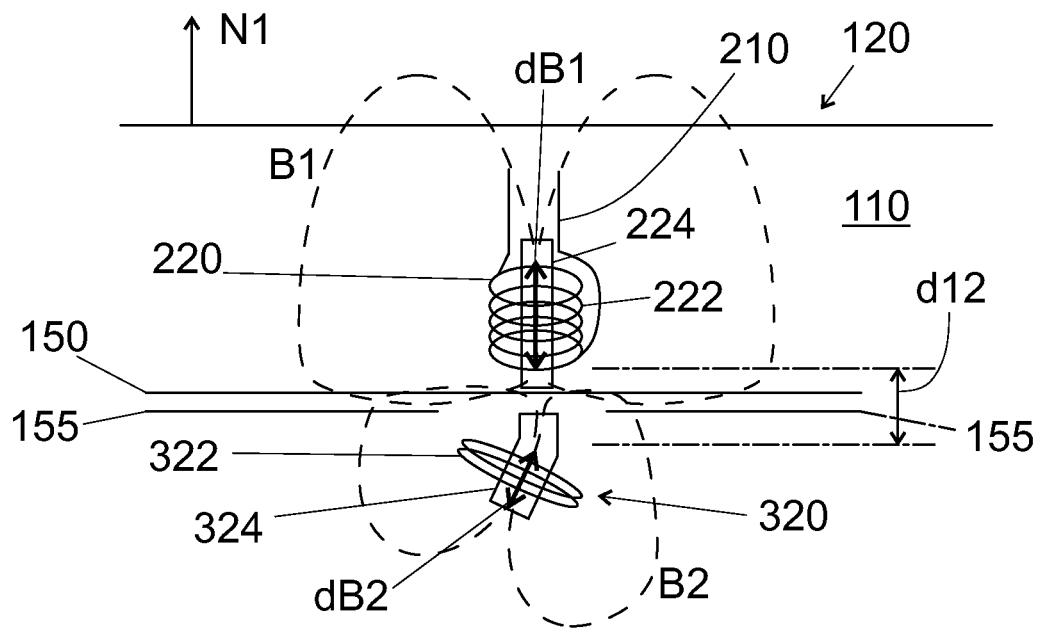

However, referring to FIG. 4c, the angle α needs not to be small. For example, a primary core 224, such a primary axle 224 can be used to guide the primary magnetic field B1. In a similar manner, a secondary core 324, such a secondary axle 324 can be used to guide the secondary magnetic field B2. In FIG. 4c, the secondary core 324 comprises a turning, whereby the secondary core 324 is configured to guide the secondary magnetic field B2 in such a way as to interact strongly with the primary magnetic field B1. In FIG. 4a, the primary core 224, i.e. the primary axle 224 is straight. However, a skilled person can easily shape the cores 224, 324 to increase magnetic interaction. In order to guide the primary magnetic field B1, in an embodiment, the primary core 224 comprises paramagnetic or ferromagnetic material. In order to guide the secondary magnetic field B2, in an embodiment, the secondary core 324 comprises paramagnetic or ferromagnetic material.

Moreover, in a preferred application, the primary direction dB1 is substantially parallel to a normal of the wearing surface 120. For example, an angle β between the primary direction dB1 and a normal N1 of the first surface 120 may be less than 30 degrees or more than 150 degrees, such as less than 15 degrees or more than 165 degrees. Herein the normal N1 refers to a normal of the surface 120 at a point that is closest to the primary capacitive component 210. This has the effect that, when the secondary inductive component 320 is arranged on an opposite side of the body 110 than the surface 120 of which wear the circuit 200 is configured to measure, the primary 220 and secondary 320 inductive components can be arranged close to each other.

Referring to FIG. 4b, in an embodiment, the device 100 comprises a first reinforcing structure 150. The purpose of the first reinforcing structure 150 is to reinforce the device 100. For example, the first reinforcing structure 150 may be a metal coating of the body 110 arranged such that the first reinforcing structure 150 forms the second surface 130 (see e.g. FIG. 1b). In the alternative, the first reinforcing structure 150 may be a wire mesh or a belt arranged inside the body 110. The first reinforcing structure 150 may be a belt of a tire 100. Since the purpose of the first reinforcing structure 150 is to reinforce the body 100, preferably, the reinforcing structure does not limit large apertures. More precisely, preferably, the first reinforcing structure 150 does not limit an aperture having an area of at least 0.5 cm². A large aperture would weaken the reinforcing structure. However, when the first reinforcing structure 150 is free from apertures, in an embodiment, a part of the first reinforcing structure 150 is arranged in between the primary inductive component 220 and the secondary inductive component 320.

Reinforcing structures such as belts typically comprise metal, since metals in general strong. However, metals in general also conduct electricity well, whereby they hinder the magnetic coupling between the primary and secondary inductive components (220, 320). In an embodiment, the first reinforcing structure 150 comprises material having an electrical resistivity of at most 1 Ωm at the temperature 23° C., such at most $10^{-5}$ Ωm at the temperature 23° C. In particular in such a case, the mutual distance and arrangement between the inductive components (220, 320) becomes important. The first reinforcing structure 150 may comprise steel, or it may consist of steel. The first reinforcing structure 150 may comprise a steel mesh.

In addition or alternatively, the first reinforcing structure 150 such as a belt may comprise fibrous material. The fibrous material of first reinforcing structure 150 may comprise at least one of cotton, rayon, polyamide (Nylon), polyester, polyethylene terephthalate, and Poly-paraphenylene terephthalamide (Kevlar).

Referring to FIG. 4c, in an embodiment, the device 100 comprises a second reinforcing structure 155. Also a part of the second reinforcing structure 155 may be arranged in between the primary inductive component 220 and the secondary inductive component 320. However, the first reinforcing structure 150 may provide sufficient reinforcement, whereby the second reinforcing structure 155 may limit a hole (i.e. an aperture), and not even a part of the second reinforcing structure 155 is left in between the primary inductive component 220 and the secondary inductive component 320.

The second reinforcing structure 155 may comprise fibrous material. The fibrous material of second reinforcing structure 155 may comprise at least one of cotton, rayon, polyamide (Nylon), polyester, polyethylene terephthalate, and Poly-paraphenylene terephthalamide (Kevlar).

Referring to FIG. 1f, the magnetic coupling between the inductive components 220, 320 can be improved by using one or two plates 225, 325 of ferromagnetic or paramagnetic material, such as ferrite or a metal comprising iron. The wear indicator 190 may comprise a primary plate 225 configured to enhance the magnetic field of the primary inductive component 220. As indicated in FIG. 1f, an imaginary axis, encircled by the primary inductive component 220, penetrates the primary plate 225. The imaginary axis may be parallel to the primary magnetic field generated B1 by the primary inductive components 220, in particular a primary coil 222, in its centre. In this way, the primary plate 225 is in magnetic connection with the primary coil 222. As indicated in FIG. 1f, preferably, the primary plate 225 is not arranged in between the primary inductive component 220 and the secondary inductive component 320.

In addition or alternatively, the wear indicator 190 may comprise a secondary plate 325 configured to enhance the magnetic field of the secondary inductive component 320. As indicated in FIG. 1f, an imaginary axis, encircled by the secondary inductive component 320, penetrates the secondary plate 325. The imaginary axis may be parallel to the secondary magnetic field B2 generated by the secondary inductive component 320, in particular a secondary coil 322, in its centre. In this way, the secondary plate 325 is in magnetic connection with the secondary coil 322. As indicated in FIG. 1f, preferably, the secondary plate 325 is not arranged in between the primary inductive component 220 and the secondary inductive component 320.

Figure 5A:
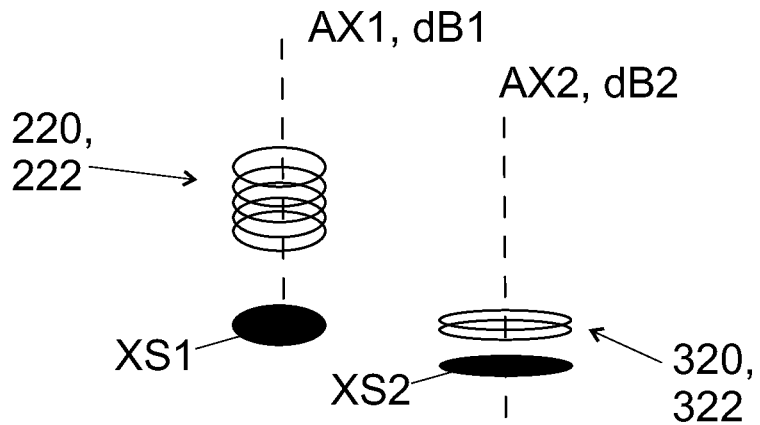

Referring to FIG. 5a, in general, the primary inductive component 220 comprises a primary coil 222 wound about a primary axis AX1 and the secondary inductive component 320 comprises a secondary coil 322 wound about a secondary axis AX2. Such axes (AX1, AX2) may be clearly defined physical axles, e.g. comprising ferromagnetic or paramagnetic material. For example, in FIG. 4c, the primary coil 222 is wound about a primary core 224, which is an axle, thus forming the primary axis AX1 (compare to FIG. 5a). In this way, the primary core 224 is in magnetic connection with the primary coil 222. Moreover, in this way, the secondary core 324 is in magnetic connection with the secondary coil 322. Moreover, in FIG. 4c, the secondary coil 322 is wound about a part of a secondary core 324. The corresponding part (onto which the secondary coil 324 is wound), thus forms the secondary axis AX2.

However, a coil may be formed in planar form on a circuit board, whereby the centre of the coil would define the corresponding axis. Moreover a coil needs not to surround any solid material. As known to a skilled person, the direction of the primary axis AX1 is parallel (i.e. unidirectional or reverse) to the aforementioned primary direction dB1 and the direction of the secondary axis AX2 is parallel (i.e. unidirectional or reverse) to the aforementioned secondary direction dB2.

Referring to FIG. 5a, the primary coil 222 has a primary cross section XS1 on a plane having a normal that is parallel to the primary axis AX1; and the secondary coil 322 has a secondary cross section XS2 on a plane having a normal that is parallel to the secondary axis AX2. As an alternative expression, the primary coil 222 is configured to form the primary magnetic field B1 that is in the centre of the primary coil 222 directed to a primary direction dB1, and the primary coil 222 has a primary cross section XS1 on a plane having a normal that is parallel to the primary direction dB1. In a similar way, the secondary coil 322 is configured to form the secondary magnetic field B2 that is in the centre of the secondary coil 322 directed to a secondary direction dB2, and the secondary coil 322 has a secondary cross section XS2 on a plane having a normal that is parallel to the secondary direction dB2. Herein the primary cross section XS1 is limited by the outermost perimeter of the primary coil 222. In addition, the secondary cross section XS2 is limited by the outermost perimeter of the secondary coil 322. The coils 222, 322 may be arranged on a printed circuit board, such as a multilayer printed circuit board.

Figure 5B:
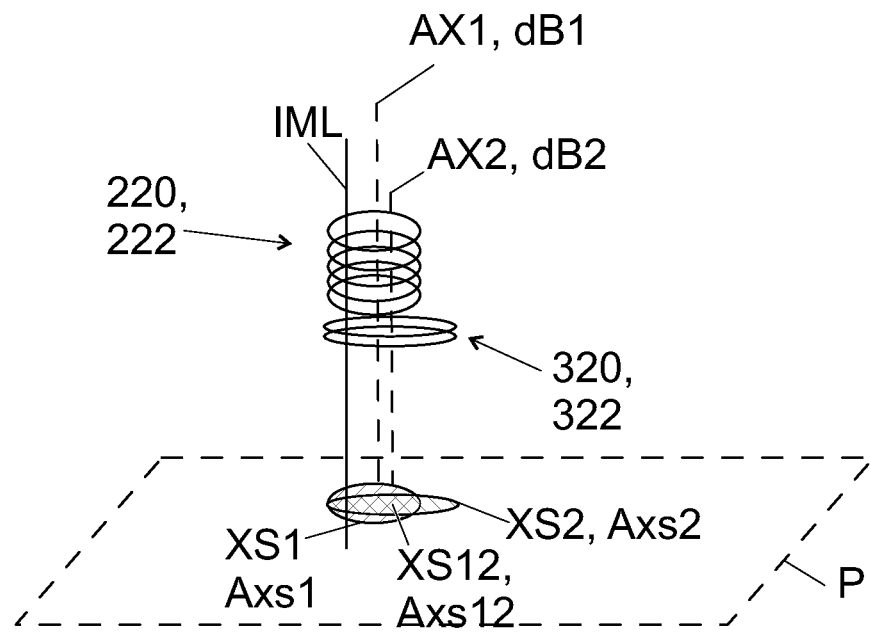

Referring to FIG. 5b, in order to have the strong coupling between the magnetic fields B1 and B2, in an embodiment, the primary cross section XS1 and the secondary cross section XS2 are arranged relative to each other in such a way that an imaginary straight line IML that is parallel to the primary direction dB1 and/or the secondary direction dB2 penetrates both the primary cross section XS1 and the secondary cross section XS2. This embodiment is shown in FIG. 5b.

As indicated in FIG. 5b, preferably, the primary and secondary cross sections XS1, XS2 overlap by a reasonably amount. As indicated in FIG. 5b, the directions dB1 and dB2 are parallel, the cross sections section XS1 and XS2 can be projected, in the direction dB1, onto a same plane P that has a normal in the direction dB1. The overlapping part XS12 of the cross sections is the intersection (intersection in the mathematical meaning, commonly denoted by XS1∩XS2) of the projections of the cross sections XS1 and XS2 on the plane P, as indicated in FIG. 5b. In case the directions dB1 and dB2 are not parallel, the projections of XS1 and XS2 can be considered to be projected in either of the directions dB1 or dB2, onto a same plane P that has a normal in the direction dB1 or dB2, respectively.

As indicated in FIG. 5b, the area Axs12 of the overlapping part XS12 is reasonably large compared to the area Axs1 of the primary cross section XS1 and/or to the area Axs2 of the secondary cross section XS2. It is also noted that the area Axs1 of the primary cross section XS1 is equal to the area Axs1 of the projection of the primary cross section XS1 on the plane. In a similar way, the area Axs2 of the secondary cross section XS2 is equal to the area Axs2 of the projection of the secondary cross section XS2 on the plane P. In a preferred embodiment, the area Axs12 of the overlapping part XS12 of the primary cross section XS1 and the secondary cross section XS2 is at least 25%, such as at least 33%, or at least half of the smaller of the following: the area Axs1 of the primary cross section XS1 and the area Axs2 of the secondary cross section XS2. More preferably, the area Axs12 of the overlapping part XS12 is at least 66%, at least 75%, or at least 90% of the smaller of Axs1 and Axs2.

In addition, the magnetic coupling of the coils 222, 322 has been observed to be good when the cross sectional size of the primary coil 222 is of the same order of magnitude as the cross sectional size of the secondary coil 322. Therefore, preferably the ratio of the cross sectional areas of the coils 322, 222, i.e. Axs2/Axs1, is from 0.1 to 10, such as from 0.2 to 5.

However, at least in some tires it may be preferable to keep the circuit 200 small. Thus, in an embodiment, the ratio Axs2/Axs1 of the area Axs2 of the secondary cross section XS2 to the area Axs1 of the primary cross section XS1 is at least 0.5 or at least 0.75 or at least 0.9. However, as indicated above, if the difference of the areas is too large, magnetic coupling starts to decrease. Thus, the ratio Axs2/Axs1 may be e.g. in the range from 0.5 to 10; or from 0.75 to 7; or from 0.9 to 5.

In addition, the magnetic coupling of the coils 222, 322 has been observed to be good when the distance d12 (see FIG. 4a) between the primary inductive component 220 and the secondary inductive component 320 is small. For example, in an embodiment, the distance d12 is at most 75 mm, such as at most 50 mm, at most 25 mm, at most 15 mm, or at most 10 mm.

Referring to FIG. 7, in an embodiment, the interrogator 300 is configured to communicate with a gateway device 400. The gateway device 400 may be configured to display a value of wear, e.g. for a user. The gateway device 400 may be configured to compare a value of wear to a limit value. The gateway device 400 may be configured send an alarm signal when the value of wear exceeds the limit value. Such an alarm signal may be optical or visual. Such an alarm signal may be sent for a user.

In addition or in the alternative, the gateway device 400 may be configured to communicate with a service provider, such as a mobile phone network. For example, gateway device 400 may be configured to communicate with a cloud service via a mobile phone network. In the alternative, the interrogator 300 may communicate directly with a service provider, such as a mobile phone network, or for example via a mobile phone network. However, having a gateway device 400 reasonably near the interrogator 300 reduces the power consumption of the interrogator 300. Typically this is beneficial, since the electric source 330 of the interrogator 300 may be hard to change or charge.

Preferably, the interrogator 300 is configured to send data to a gateway device 400 that is arranged at most 50 metres, preferably at most 20 metres, such as at most 10 metres away from the interrogator 300. Preferably, the gateway device 400 is configured to send and receive data from a cloud server 500. The interrogator 300 may be configured to communicate with the gateway device 400 through a Bluetooth technology. The interrogator 300 may be configured to communicate with the gateway device 400 wirelessly using radio waves at a frequency range from 2.4 GHz to 2.485 GHz.

In an embodiment, the interrogator 300 is configured to measure at least one of [i] a mutual inductance of the secondary capacitive component 320 and the circuit 200, [ii] an inductance of the circuit 200, and [iii] a resonance frequency of oscillation of the circuit 200. Such measured data is indicative of wear w of the first surface 120 as detailed above. Moreover, in an embodiment, the interrogator 300 is configured to determine a value of wear w using the measured data (i.e. the data indicative of the wear). The interrogator 300 may send the value of wear to the gateway device 400 or directly to a cloud server 500. In the alternative, the interrogator 300 may send the data indicative of the wear to the gateway device 400 or directly to the cloud server 500. Correspondingly, the gateway device 400 or the cloud server 500 may be configured to determine a value of wear w using the received data indicative of the wear.

An embodiment of the invention is also a system for measuring a wear w of a surface 120. Such a system comprises the device 100 (i.e. the tire with the circuit 200 and the interrogator 300 attached to it) and the gateway device 400. The interrogator 300 of the device 100 is configured to send data to the gateway device 400. The gateway device 400 is configured to receive data from the interrogator 300. The gateway device 400 may be configured to communicate with the user as indicated above. The gateway device 400 may be configured to communicate with the cloud server 500 as indicated above.

It is possible to receive a wear indicator 190 (see FIG. 1a) comprising a separate circuit 200 and separate interrogator 300. Moreover, the tire 100 with a wear indicator can be formed by arranging the circuit 200 and interrogator 300 relative to each other and the body 110 of the tire following the principles presented above. Correspondingly, the wear indicator 190 is arranged to a body 110. As indicated above, the body 110 may be a tread or a tread block of a tire, e.g. a pneumatic tire.

An embodiment of such a method comprises receiving (e.g. arranging available) the wear indicator 190. As indicated above, the wear indicator 190 comprises [i] a circuit 200 comprising a primary capacitive component 210 configured to wear and a primary inductive component 220 and [ii] an interrogator 300 comprising an electric source 330, a communication circuit 310, and a secondary inductive component 320. In the method, at least a part of the primary capacitive component 210 of the circuit 200 is arranged into the body 110, i.e. a tread of a tire. The tread may comprise tread blocks, and the primary capacitive component 210 may be arranged into a tread block. Moreover, an embodiment comprises arranging the primary inductive component 220 of the circuit 200 with respect to the body 110 such that at least part of the primary capacitive component 210 is closer to the wearing surface 120 than at least a part of the primary inductive component 220. Moreover, the interrogator 300 is attached to the body 110 or to the circuit 200. The interrogator 300 is attached such that at least a part of the secondary inductive component 320 is arranged further away from the wearing surface 120 than the part of the primary inductive component 220.

A preferred embodiment comprises attaching the interrogator 300 onto another surface 130 of the tire 100. The surface may be a surface 130 of a cavity of the tire. The surface 130 may be an inner surface of the tire, which is a pneumatic tyre. An embodiment comprises attaching the interrogator 300 at least partly into the tire 100.

FIG. 9a shows a tire 100, which is a pneumatic tire. As well known, a tire has a tread 120. The tread 120 is an outer surface of the tire. The tread is formed as a surface of a tread block arrangement 114. The tread block arrangement 114 includes tread blocks 110, arranged in such a way that a groove or grooves are left in between the tread blocks 110, as indicated in FIG. 9a. Correspondingly, a single tread block 110 forms at least a part, typically only a part, of the tread 120. The tread 120 is intended for a rolling contact against a surface 900 when the pneumatic tire 100 is used. The tread 120 has a surface normal substantially parallel to the radial direction SR of the tire 100, the radial direction SR being perpendicular to the axis of rotation AXR of the tire 100.

A pneumatic tire 100 is an example of the device 100 discussed above. The tread blocks of the pneumatic tire 100 form a body having a wearing surface 120. In case of a pneumatic tire, the wearing surface 120 is the tread of the pneumatic tire 100.

Referring to FIG. 9b, the tire 100 comprises tread blocks 110. At least a tread block is equipped with the circuit 200 as indicated above. The circuit 200 is arranged in a tread block in such a way that the primary capacitive component 210 wears as the tread 120 wears. When the tread 120 wears, also the part of the tread 120 that is formed by the surface of the tread block 110 having the circuit 200 wears. The primary capacitive component 210 is electrically coupled to the primary inductive component 220. The interrogator 300 arranged on the inner surface 130 of the pneumatic tire 100. The primary inductive component 220 is aligned with the secondary inductive component 320 in a way discussed in detail above.

In a pneumatic tire 100, the distance d12 (see FIG. 4a) between the primary inductive component 220 and the secondary inductive component 320 is typically at most 75 mm, as indicated above. However, the magnetic coupling between the inductive components 220, 320 is typically the better the closer the inductive components 220, 230 are to each other. Thus, the distance d12 is preferably smaller, as indicated above.

In a pneumatic tire 100, the tread block 110 comprises first material, such as rubber. Moreover, in an embodiment, the circuit 200 is arranged in a blind hole 112 of the tread block 110. Thus, the tread block 110 limits a blind hole 112 for the circuit 200. Before arranging at least a part of the circuit 200 or the whole circuit 200 into a blind hole of the tread block, a bind hole may be arranged into the tread block 110. The blind hole may be manufactured in a mould during vulcanization of the tire 100, or it may be manufactured, e.g. drilled, after vulcanization.

Referring also to FIGS. 8a and 8b, in such an embodiment, at least some of the dielectric material 213 of the primary capacitive component 210 is left in between a part of the tread block 110 and the first electrode 212 or a capacitor $210_1$ in a direction that is perpendicular to a normal N1 of the tread 120. Preferably, the dielectric material 213 is not the same material as the first material. However, preferably, the primary capacitive component 210 is at most as resistant to wear as the tread 120. Therefore, the dielectric material 213 may be reasonably soft. For example, the dielectric material 213 may be at most as resistant to wear as the tread 120.

When the circuit 200 and the interrogator are arranged as parts of a pneumatic tire 100, the gateway device 400 (see FIG. 7) may be arranged in the car on which wheel the pneumatic tire is configured to be arranged.

Referring to FIG. 9b, a pneumatic tire 100 typically comprises a reinforcing belt 150. The reinforcing belt 150 comprises first cords. At least some of the first cords typically comprise metal, such as steel. The first cords may, in the alternative or in addition, comprise fibrous material, such as at least one of glass fibres, carbon fibres, aramid fibres and para-aramid fibres (i.e. Kevlar®). When the first cord comprise steel, the reinforcing belt 150 is commonly referred to as a steel belt 150. Most typically, steel belts are used to reinforce the tire 100. In an embodiment, the reinforcing belt 150 comprises material having an electrical resistivity of at most 1 Ωm at the temperature 23° C., such as at most $10^{-5}$ Ωm at the temperature 23° C. In particular in such a case, the mutual distance and arrangement between the inductive components (220, 320) becomes important.

Since the purpose of the reinforcing belt 150 is to reinforce, the reinforcing belt 150 is preferably integral, i.e. not provided with large holes.

Correspondingly, in an embodiment, a part of the reinforcing belt 150 is arranged in between the primary inductive component 220 and the secondary inductive component 320. In particular, when the reinforcing belt 150 is arranged in between the inductive components 220 and 320 and the reinforcing belt 150 comprises steel, the mutual alignment of the primary inductive component 220 and the secondary inductive component 320 is important. The short mutual distance d12, as discussed above, and/or the having substantially parallel magnetic fields, as indicated by the directions dB1 and dB2 above, improves the coupling also in these cases.

As indicated in FIG. 9b, an embodiment of the pneumatic tire 100 comprises a ply 155 or plies 155. The ply or plies 155 comprise rubber as a matrix material and second cords integrated with the matrix. The second cords may comprise fibrous material. The fibrous material of the second cords may comprise at least one of cotton, rayon, polyamide (Nylon), polyester, polyethylene terephthalate, and Poly-paraphenylene terephthalamide (Kevlar). The second cords reinforce the ply or plies 155.

In an embodiment, a part of the ply 155 or a part of at least one of the plies 155 is arranged in between the primary inductive component 220 and the secondary inductive component 320. This has the effect that also the ply 155 or plies 155 may be made integral, i.e. not provided with large holes. Thus, the reinforcing effect of the plies is utilized in full.

However, the reinforcing effect of the belt 150 may be sufficient. In such a case, the ply 155 or plies 155 may limit a hole. In such an embodiment, the primary inductive component (220) and secondary inductive component 320 are arranged relative to the hole in such a way that the ply 155 or the plies 155 is/are not left in between the primary inductive component 220 and the secondary inductive component 320.

In case the interrogator 300 is arranged inside a pneumatic tire 100, the interrogator 300 preferably comprises the secondary sensor arrangement 340 as discussed above. The secondary sensor arrangement 340 may comprise e.g. (1) a pressure sensor, (2) an acceleration sensor, (3) a pressure sensor and an acceleration sensor, (4) a pressure sensor and a temperature sensor, (5) a pressure sensor, a temperature sensor, and an acceleration sensor; or any other combination of a pressure sensor, an acceleration sensor, and a temperature sensor.

In case the interrogator 300 is arranged inside a non-pneumatic tire 100, the interrogator 300 preferably comprises the secondary sensor arrangement 340 as discussed above. The secondary sensor arrangement 340 may comprise e.g. (1) an acceleration sensor, (2) a temperature sensor, or (3) an acceleration sensor and temperature sensor.

A pneumatic tire 100 with a wear indicator 190 can be manufactured e.g. by arranging available the circuit 200 and the interrogator 300 as detailed above. Moreover, at least a part of the primary capacitive component 210 of the circuit 200 is arranged into the tread block 110 and the primary inductive component 220 is arranged into the pneumatic tire 100 such that at least part of the primary capacitive component 210 is closer to the tread 120 than at least a part of the primary inductive component 220. Preferably also the primary inductive component 220 is arranged in the tread block 110. As indicated above, the circuit 200 may be e.g. arranged in a bling hole 112 of a tread block.

Furthermore, the interrogator 300 is attached onto a surface of a cavity limited by the tire, e.g. an inner surface 130 of the pneumatic tire 100, or at least partly into the tire 100 such that at least a part of the secondary inductive component 320 is arranged further away from the tread 120 than the part of the primary inductive component 220. Preferably, the interrogator 300 is attached onto an inner surface 130 of the pneumatic tire 100.

The invention claimed is:

1. A tire configured to rotate about an axis of rotation, the tire comprising:
a tread block forming at least a part of a tread of the tire,
a circuit comprising:
a primary capacitive component, wherein at least a part of the primary capacitive component is arranged a first distance apart from the tread and inside the tread block; and
a primary inductive component of which at least a part is arranged a second distance towards the interior of the tire from the tread, the primary inductive component comprising a primary coil configured to form a primary magnetic field that is in a center of the primary coil directed to a primary direction, the primary coil having a primary cross section on a plane having a normal that is parallel to the primary direction; and
an interrogator comprising:
an electric source,
a communication circuit, and
a secondary inductive component comprising a secondary coil configured to form a secondary magnetic field that is in a center of the secondary coil directed to a secondary direction, the secondary coil having a secondary cross section on a plane having a normal that is parallel to the secondary direction;
wherein:
the secondary inductive component is arranged on the same side of the tread as the primary inductive component,
at least a part of the secondary inductive component is arranged a third distance apart from the tread, the third distance being greater than the second distance,
the primary capacitive component is configured to wear as the tread wears, and
the second distance is greater than the first distance,
whereby at least a part of the primary capacitive component is configured to wear before the primary inductive component,
wherein the primary cross section and the secondary cross section are arranged relative to each other so that an imaginary straight line that is parallel to the primary axis and/or the secondary axis penetrates both the primary cross section and the secondary cross section; and
wherein the primary capacitive component comprises a first electrode and a second electrode, the first and second electrodes forming a capacitor, the first and second electrodes forming the capacitance of the primary capacitive component, the first and second electrodes are configured to wear while the tire is being used, and the first and second electrodes are configured so that:
for a first value of wear, a derivative of the capacitance of the primary capacitive component with respect to wear has a first value of capacitance change;
for a second value of wear, a derivative of the capacitance of the primary capacitive component with respect to wear has a second value of capacitance change; and
the first value of capacitance change is different from the second value of capacitance change.

2. The tire of claim 1, wherein:
the interrogator is arranged on surface of the tire or at least partly in the tire.

3. The tire of claim 1, wherein
the primary inductive component is configured to form a primary magnetic field that is in the center of the primary inductive component directed to a primary direction, and
the secondary inductive component is configured to form a secondary magnetic field that is in the center of the secondary inductive component directed to a secondary direction,
wherein:
an angle between the primary direction and a normal of the tread is less than 30 degrees or more than 150 degrees.

4. The tire of claim 1, wherein
a distance between the primary inductive component and the secondary inductive component is at most 75 mm.

5. The tire of claim 1, wherein
[A]
the primary inductive component comprises a primary coil and at least one of:
a primary core in magnetic connection with the primary coil, or
a primary plate in magnetic connection with the primary coil, and
the primary core or the primary plate comprises paramagnetic or ferromagnetic material; and/or
[B]
the secondary inductive component comprises a secondary coil, and at least one of:
a secondary core in magnetic connection with the secondary coil or
a secondary plate in magnetic connection with the secondary coil, and
the secondary core or the primary plate comprises paramagnetic or ferromagnetic material.

6. The tire of claim 1, wherein the interrogator is configured to measure at least one of:
a mutual inductance of a secondary capacitive component and the circuit, an inductance of the circuit, and
a frequency of oscillation of the circuit.

7. The tire of claim 1, wherein the circuit is energetically passive.

8. The tire of claim 1, wherein:
the tread block comprises first material,
the tread block limits a blind hole for the circuit,
the primary capacitive component comprises at least a part of a capacitor and dielectric material such that
at least some of the dielectric material is left in between a part of the tread block and the part of the capacitor in a direction that is perpendicular to a normal of the tread.

9. The tire of claim 1, comprising:
a reinforcing belt, and
a part of the reinforcing belt is arranged in between the primary inductive component and the secondary inductive component,
a ply or plies comprising fibrous material.

10. The tire of claim 1, wherein:
the interrogator comprises, in addition to the secondary inductive component, a secondary sensor arrangement.

11. The tire of claim 1, wherein an area of an overlapping part of the primary cross section and the secondary cross section is at least 25% of the smaller of the following: an area of the primary cross section and an area of the secondary cross section.

* * * * *